Feb. 5, 1963 W. C. ANDERTON Re. 25,327

MULTIPLE SLIDE CHANGER FOR AUTOMATIC SLIDE PROJECTOR

Original Filed Nov. 12, 1957

INVENTOR

WALTER CARLOS ANDERTON

BY Chas. Denegre

ATTORNEY

United States Patent Office

Re. 25,327
Reissued Feb. 5, 1963

25,327
MULTIPLE SLIDE CHANGER FOR AUTOMATIC SLIDE PROJECTOR

Walter Carlos Anderton, Birmingham, Ala., assignor to General Aniline & Film Corporation, New York, N.Y., a corporation of Delaware Original No. 2,865,121, dated Dec. 23, 1958, Ser. No. 695,916, Nov. 12, 1957. Application for reissue Dec. 19, 1960, Ser. No. 76,987
5 Claims. (Cl. 40—79)

Figure 1:
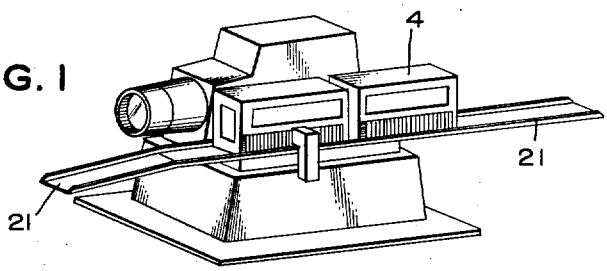

Matter enclosed in heavy brackets [ ] appears in the original patent but forms no part of this reissue specification; matter printed in italics indicates the additions made by reissue.

This invention relates to a multiple slide changer for automatic slide projector. It has for its main objects to provide such a device that will be highly satisfactory for the purpose intended, simple in structure, comparatively cheap to manufacture, easy to use and keep in working condition, and very durable.

A further object is to overcome the objection of having to place one slide container at a time in a projector *in order* to show the plurality of pictures in the container, by providing simple *intercoupling* means for carrying through a plurality of containers removably attached together for the purpose.

Other objects and advantages will appear from the drawing and description.

Figure 2:
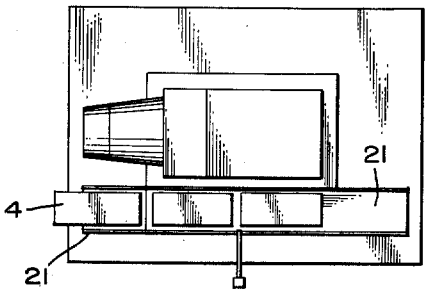
Figure 3:
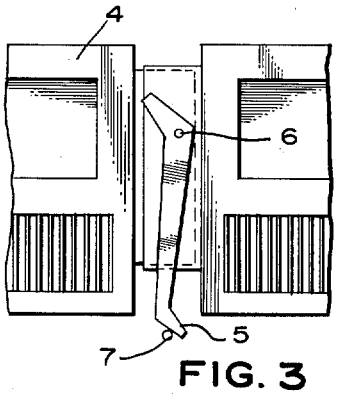
Figure 5:
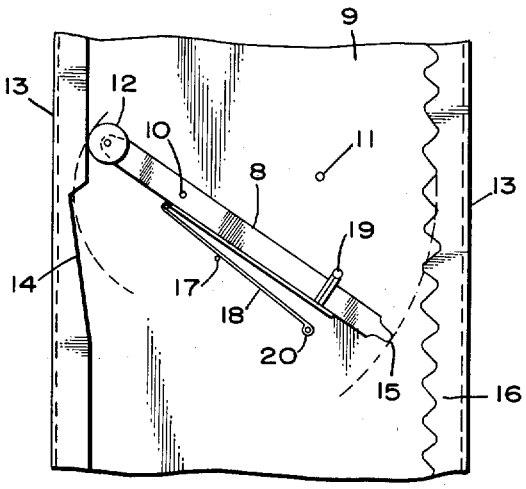
Figure 4:
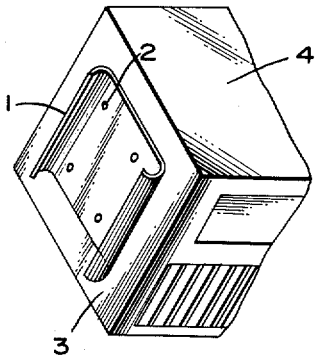

By referring generally to the drawing it will be observed that FIG. 1 is a perspective view of an automatic picture slide projector with two slide containers mounted on same in accordance with the present invention; FIG. 2 is a top plan view of parts shown in FIG. 1; FIG. 3 is a detail view showing the ends of two slide containers removably attached together with *a* releasing lever between *them* in position for use; FIG. 4 is an enlarged perspective view of [an] *one* end of a slide container with a holding clip according to this invention thereon; and FIG. 5 is an enlarged detail view showing the *forwarding* bar for use at the joint between slide container ends, and part of a bottom of a container.

Similar reference numerals refer to [similar] *identical* parts throughout the several views.

The projector shown and its *manually or* electrically operated mechanism are not claimed as any part of the present invention which is limited to the means of [connecting] *interconnecting* and controlling a plurality of picture slide containers along on the projector rather than placing one container at a time on the projector [to show] *for the showing of* the pictures [in same] *therein.*

Referring to the drawing in detail it will be seen that the device comprises *by way of example,* a curved end clip 1 attached by rivets 2 on the end face 3 of a regular picture slide container 4. Such a clip is attached on each end of each container as shown in FIG. 3 and are removably held together by one clip fitting into the other as a result of being made of thin plate steel. A lever 5 is *pivotally* attached on a small stud 6 mounted on one end of each container. A stud 7 is mounted on the base portion of the projector to make contact with the [lever] outer end *of the lever 5 so as* to separate the [clip] joint *formed by the clips 1.* A bar 8 is mounted on the base face 9 of the projector. The bar *8* is swingable on a stud 10 attached in the base *9*. A second stud 11 in the base *9* acts as a stop of the bar *8*. A roller 12 is mounted on a shaft in one end of the bar *8* and is adapted to roll along on a raised edge 13 of the *slide* container. The edge *13* is provided with a recess 14 for the roller *12* to enter *forcing the bar 8 to swing around the stud 10 and* to cause the pointed end 15 of the bar *8* to [move out of] *engage* the rack of gear teeth 16 *of the container and thereby,* [which are part of the regular mechanism] to advance the slide container *the distance necessary to compensate for the gap between the containers caused by the interengaging clips* [when mounted on the projector]. A third stud 17 is attached [in] *to* the [fact] *base 9* of the projector as a stop for *the bar 8 powered by* a spring 18 attached by stud 20 to the base. The *pointed end 15* of the bar *8* is provided with a spring type hinge 19 set in tension [to] *allowing the* return *of* the bar *8* to its straight position [after it jumps] *in that* its pointed end *15* [from] *will ride over* the last gear tooth of the used slide container to the first tooth of the attached container. An extension 21 is mounted on the projector to accommodate additional [slides] *slide* containers.

From the foregoing it will appear that the parts of the present invention are adapted for attachment to a regular picture projector and its slide containers for the purpose of using a plurality of containers by attaching [same] *them* together rather than placing each container separately for use.

The various parts may be made of any material suitable for the purpose, but I prefer to use good grades of metal. Also the parts may be made in different sizes and capacities.

While I have shown and described the preferred embodiment of my invention, I do not wish to limit same to the exact and precise details of structure, and reserve the right to make all modifications and changes [so] *as* long as they remain within the scope of the invention and the following claims.

Having described my invention, I claim:

1. A multiple slide changer for automatic slide projectors comprising, containers for picture slides, a spring type clip attached on each end of the container, said clips being adapted to fit removably together and hold two containers together for use on a picture projector, a base portion for supporting said containers, a lever mounted on one end of each container, a stud mounted on said base portion adjacent an end of said lever, said lever being adapted to separate a clip joint when the free end of the lever makes contact with the said adjacent stud; a bar, said bar being mounted swingably on the bottom upper face of a projector, said bar being provided with a roller in one end and a spring type hinge joint in its other end portion, a spring attached near said bar, three studs mounted in the face of the base as stops for said bar; an edge of the container having part removed to form a recess for said roller, the opposite edge of the container being formed as a rack of gear teeth, one end of the said bar being pointed and adapted to fit in said gear teeth, said bar being adapted to move its pointed end from the last gear tooth in one slide container to the first gear tooth in another slide container when the containers are held together by said clip joint and moved along by the mechanism of the projector.

2. Parts for use in combination with a regular picture projector and containers for slides with pictures therein, said parts comprising, containers for picture slides, a spring type clip attached on each end of the container, said clips being adapted to fit removably together and hold two containers together for use on a picture projector, a lever mounted on one end of each container, a base portion for supporting said containers, a stud mounted on said base portion adjacent an end of said lever, said lever being adapted to separate a clip joint when the free end of the lever makes contact with the said adjacent stud; a bar, said bar being mounted swingably on the bottom upper face of a projector, said bar being provided with a roller in one end and a spring type hinge joint in its other end portion, a spring attached near said bar, three studs mounted in the face of the base as stops for said bar; an edge of the container having part removed to form a recess for said roller, the opposite edge of the container being formed as a rack of gear teeth, one end of the said bar being pointed and adapted to fit in said gear teeth, said bar being adapted to move its pointed end from the last gear tooth in one slide container to the first gear tooth in another slide container when the containers are held together by said clip joint and moved along by the mechanism of the projector.

*3. In combination, a photographic slide projector having a support adapted to hold several slide containers each accommodating a plurality of slides, advancing means in said projector for engaging and progressively moving one of said containers over said support for successive projection of each of said slides therein, intercoupling means at ends of said containers for engaging a succeeding container whereby upon progressive movement of one of said containers by said advancing means, the succeeding container is constrained to follow the preceding container on said support.*

*4. In combination, a photographic slide projector having a support adapted to hold several slide containers each accommodating a plurality of slides, advancing means in said projector for engaging and progressively moving one of said containers over said support for successive projection of each of said slides therein, intercoupling means at ends of said containers for engaging a succeeding container whereby upon progressive movement of one of said containers by said advancing means, the succeeding container is constrained to follow the preceding container on said support, said intercoupling means being so constructed as to be operable for disengaging a projected container during progress of said containers on said support.*

*5. The combination in accordance with claim 4 wherein said coupling means comprises a resilient clip attached to each end of said container, lever means on said container for separating coengaging clips of interconnected containers, and said projector having means for actuating said lever means upon movement of a container to a predetermined position on said support.*

References Cited in the file of this patent or the original patent

UNITED STATES PATENTS

| | | |
|---|---|---|
| 1,559,964 | Jackson | Nov. 3, 1925 |
| 1,870,907 | Groomes | Aug. 9, 1932 |
| 2,756,630 | Goldberg | July 31, 1952 |
| 2,867,025 | Aler | Jan. 6, 1959 |
| 2,998,665 | Dierner | Sept. 5, 1961 |